US012593383B2

(12) United States Patent
Saccavini et al.

(10) Patent No.: US 12,593,383 B2
(45) Date of Patent: Mar. 31, 2026

(54) TOPOLOGY-INDEPENDENT SWITCHING REGULATOR CIRCUIT, SWITCH MODE DRIVER, AND LUMINAIRE

(71) Applicant: Tridonic GmbH & Co KG, Dornbirn (AT)

(72) Inventors: Lukas Saccavini, Dornbirn (AT); Hans Auer, Dornbirn (AT); Fabio Romano, Altach (AT); Stefan Stark, Muntlix (AT); Clemens Kucera, Bludenz (AT)

(73) Assignee: Tridonic GmbH & Co KG, Dornbirn (AT)

( * ) Notice: Subject to any disclaimer, the term of this patent is extended or adjusted under 35 U.S.C. 154(b) by 7 days.

(21) Appl. No.: 18/726,192

(22) PCT Filed: Jan. 16, 2023

(86) PCT No.: PCT/EP2023/050854
§ 371 (c)(1),
(2) Date: Jul. 2, 2024

(87) PCT Pub. No.: WO2023/143946
PCT Pub. Date: Aug. 3, 2023

(65) Prior Publication Data
US 2025/0159773 A1 May 15, 2025

(30) Foreign Application Priority Data
Jan. 31, 2022 (EP) .................................... 22154142

(51) Int. Cl.
*H05B 45/3725* (2020.01)

(52) U.S. Cl.
CPC ................................ *H05B 45/3725* (2020.01)

(58) Field of Classification Search
CPC ... H05B 45/3725; H05B 47/165; Y02B 20/30
See application file for complete search history.

(56) References Cited

U.S. PATENT DOCUMENTS

2010/0026208 A1 2/2010 Shteynberg et al.

FOREIGN PATENT DOCUMENTS

CN 104993704 A * 10/2015
EP 2621247 A1 7/2013

(Continued)

OTHER PUBLICATIONS

PCT/EP2023/050854, International Search Report and Written Opinion dated Apr. 3, 2023, 12 pages.

*Primary Examiner* — Abdullah A Riyami
*Assistant Examiner* — Syed M Kaiser
(74) *Attorney, Agent, or Firm* — Andrus Intellectual Property Law, LLP

(57) ABSTRACT

Disclosed is an integrated circuit, IC (1), for switching regulation of switch mode drivers (2) of various driver topologies is provided. The IC (1) comprises a state machine (11) including a finite plurality of states (Sx). A quantity of the plurality of states (Sx) is adaptable to a designated driver topology (21) of the various driver topologies. A behavior of the plurality of states (Sx) is adaptable to the designated driver topology (21) via respective state registers (111) in terms of: at least one action (1111) being executed in the respective state, and at least one transition from the respective state to a subsequent state of the plurality of states (Sx) according to an associated stimulus. Its general suitability for various driver topologies renders the IC future-proof and long-lived.

12 Claims, 8 Drawing Sheets

(56) References Cited

FOREIGN PATENT DOCUMENTS

| | | | | | |
|---|---|---|---|---|---|
| EP | 2830394 | A1 * | 1/2015 | ............. | H05B 45/10 |
| JP | 2006506938 | A * | 2/2006 | .......... | H02M 3/1588 |
| RU | 2629242 | C2 * | 8/2017 | ............. | A61N 1/303 |

* cited by examiner

S1: ON State

S2: OFF State

S3: DCM State

S4: Error State

S1: HS ON State

S2: Delay State

S3: LS ON State

S4: Delay State

S5: Error State

TOPOLOGY-INDEPENDENT SWITCHING REGULATOR CIRCUIT, SWITCH MODE DRIVER, AND LUMINAIRE

CROSS REFERENCE TO RELATED APPLICATIONS

The present application is the U.S. national stage application of international application PCT/EP2023/050854 filed Jan. 16, 2023, which international application was published on Aug. 3, 2023 as International Publication WO 2023/143946 A1. The international application claims priority to European Patent Application No. 22154142.8 filed Jan. 31, 2022.

TECHNICAL FIELD OF THE INVENTION

The present disclosure relates to lighting technology, and in particular to an integrated circuit for switching regulation of switch mode drivers of various driver topologies, and a switch mode driver and a luminaire comprising said integrated circuit.

BACKGROUND OF THE INVENTION

It is generally known that integrated circuits (ICs), such as ASICS, for switching regulation of switch mode drivers, such as LED drivers, operate in accordance with a state machine. Each state involves at least one action, such as driving a power switch of the driver, and at least one state transition in response to a defined stimulus/event.

Such a state machine is usually hardcoded, customized for the underlying driver topology and requires modification if the underlying driver topology changes (e.g., from a flyback converter to a resonant converter). In ASIC designs, the state machine cannot be adapted. In microcontroller designs, a recompilation of executable instructions is required.

Accordingly, there is a need to improve switching regulation of the background art for deployment in various driver topologies.

SUMMARY OF THE INVENTION

This is achieved by the embodiments as defined by the appended independent claims. Preferred embodiments are set forth in the dependent claims and in the following description and drawings.

A first aspect of the present disclosure relates to an integrated circuit, IC, for switching regulation of switch mode drivers of various driver topologies. The IC comprises a state machine including a finite plurality of states. A quantity of the plurality of states is adaptable to a designated driver topology of the various driver topologies. A behavior of the plurality of states is adaptable to the designated driver topology via respective state registers in terms of: at least one action being executed in the respective state, and at least one transition from the respective state to a subsequent state of the plurality of states according to an associated stimulus.

The IC may further comprise a number of peripheral mappings, being adaptable to the designated driver topology via respective peripheral registers in terms of: a mapping of at least one sense pin of the designated driver topology and at least one analog resource of the IC.

The at least one analog resource may comprise one or more of: a comparator, a clamper, an analog-to-digital converter, and a digital input.

The at least one action may comprise one or more of: a setting of a switch driver status, a starting of a timer, and a stopping of the timer.

The at least one action may be executable responsive to an entry into the respective state, or an exit from the respective state.

The associated stimulus may comprise one or more of: a timeout of the timer, a level change of the comparator, a level change of an error signal, a level change of a state or synchronization signal, and a level change of a signal of the digital input.

The IC may comprise an application-specific integrated circuit, ASIC.

The switch mode driver may comprise an LED driver.

A second aspect of the present disclosure relates to a switch mode driver, comprising a designated driver topology and an IC of the first aspect for switching regulation of the switch mode driver according to the designated driver topology.

The driver topology may comprise one of: a buck converter, a boost converter, a buck-boost converter, a flyback converter, a resonant converter, and a self-oscillating resonant converter.

The switch mode driver may further comprise a microcontroller, being arranged to adapt the number of peripheral mappings to the driver topology.

The microcontroller may further be arranged to adapt the quantity of the plurality of states of the state machine to the designated driver topology, and to adapt the behavior of the plurality of states of the state machine to the driver topology using the adapted number of peripheral mappings.

The switch mode driver may comprise an LED driver.

A third aspect of the present disclosure relates to a luminaire, comprising a switch mode driver of the second aspect and at least one light-emitting diode, LED, being operable by the switch mode driver.

According to the present disclosure, switching regulation is improved for deployment in various driver topologies by providing a switching regulator IC, such as an ASIC, with an adaptable state machine. This means that both a quantity of its plurality of states can be adapted to a designated driver topology, such as a flyback, boost or LLC converter, as well as a behavior of the respective state. In other words, the state machine may be customized for the designated driver topology without changing a physical structure of the state machine. The state machine can be configured flexibly via registers.

Based on the adaptable state machine, the IC can control different driver topologies as necessary, is thus future-proof and increases a lifespan of the IC.

Custom integrated circuits for different current sources are no longer needed, such that a large amount of logic can be saved (cost reduction).

BRIEF DESCRIPTION OF THE DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
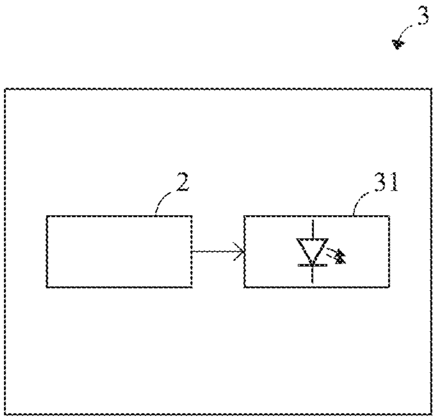

The drawings are to be regarded as being schematic representations, and elements illustrated in the drawings are not necessarily shown to scale. Rather, the various elements are represented such that their function and general purpose become apparent to those skilled in the art.

Figure 2:
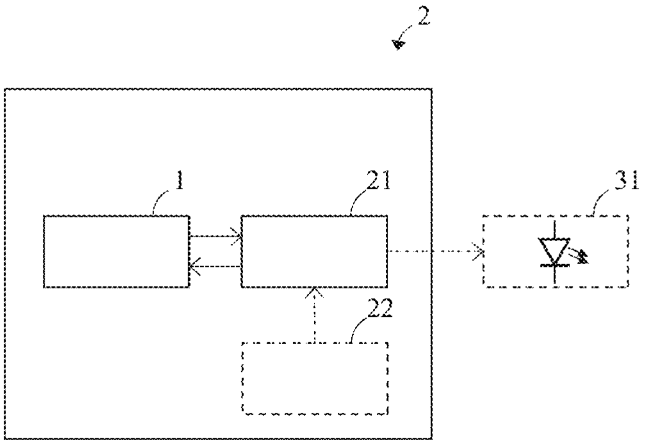
Figure 3:
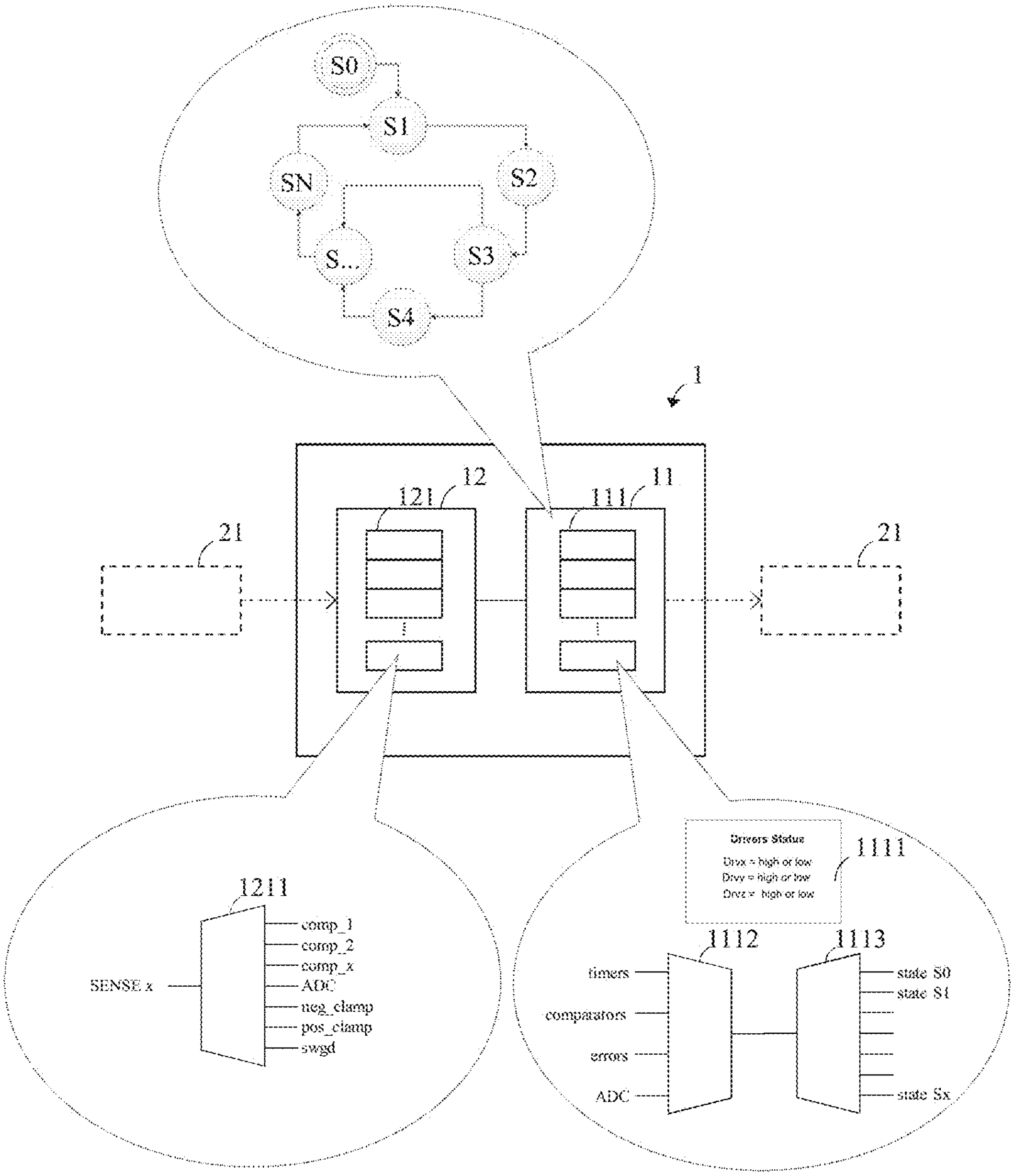
Figure 4:
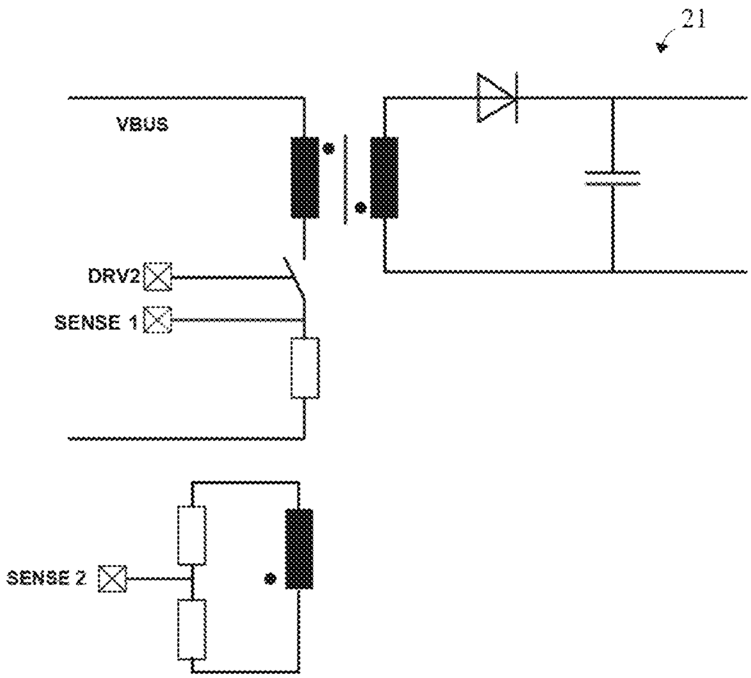
Figure 5:
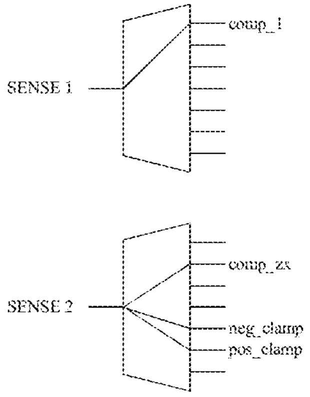
Figure 6:
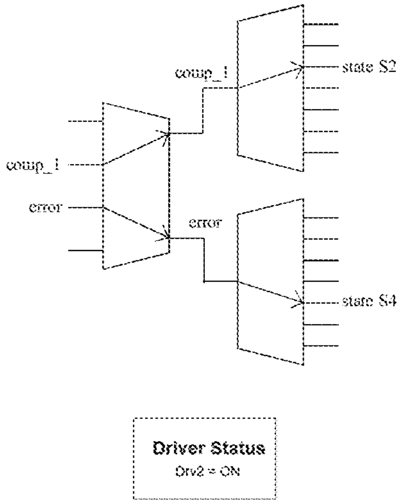
Figure 7:
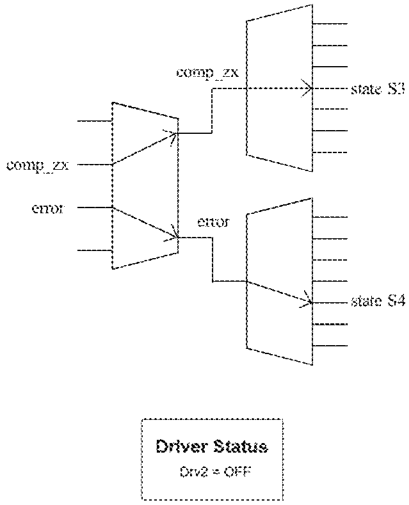
Figure 8:
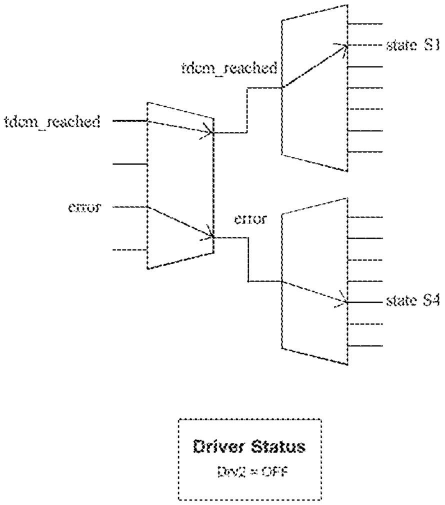
Figure 9:
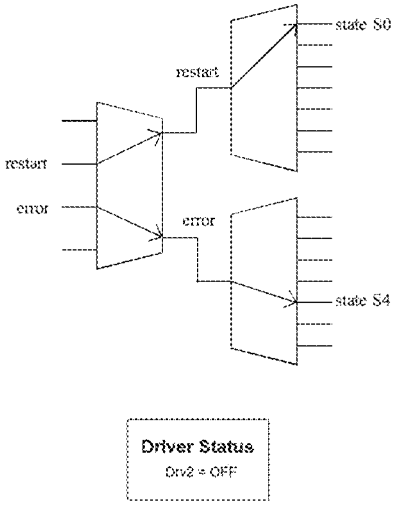
Figure 10:
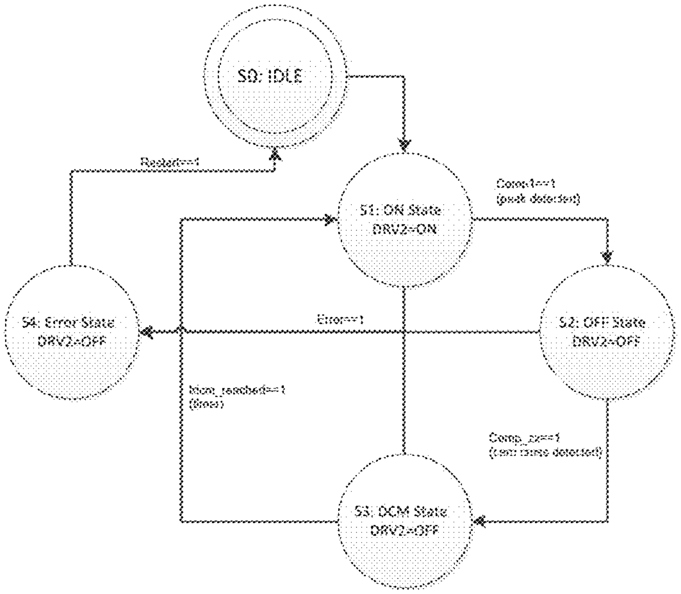
Figure 11:
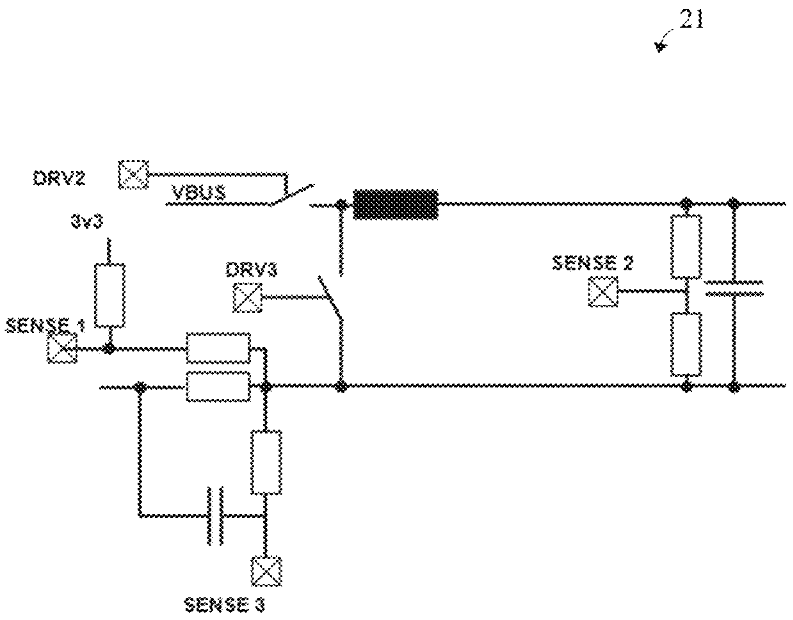
Figure 12:
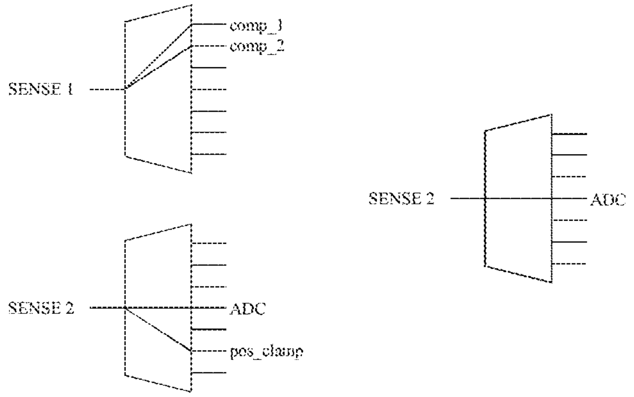
Figure 13:
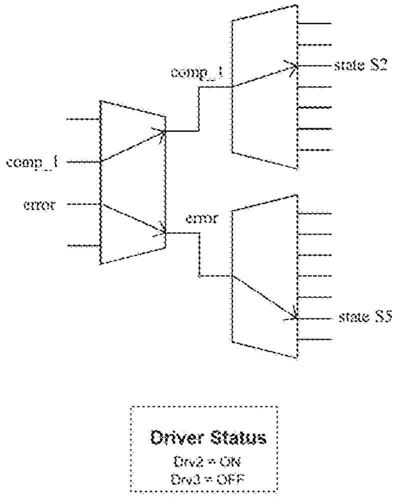
Figure 14:
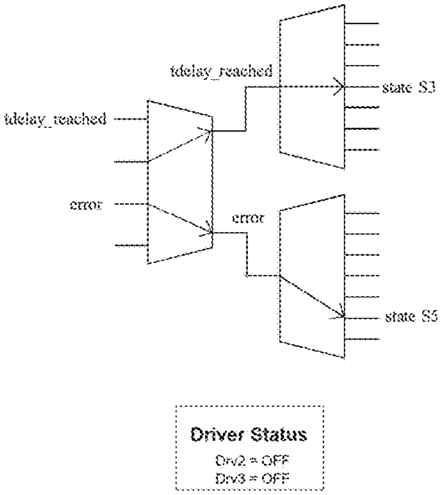
Figure 15:
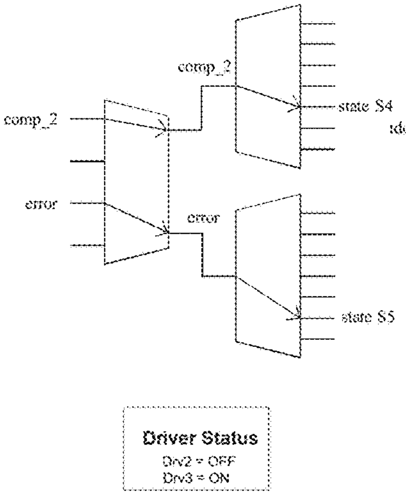
Figure 16:
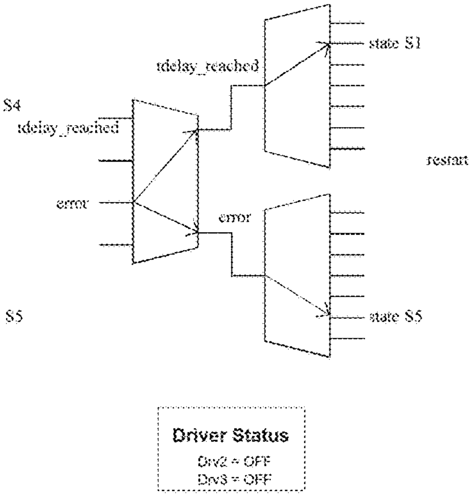
Figure 17:
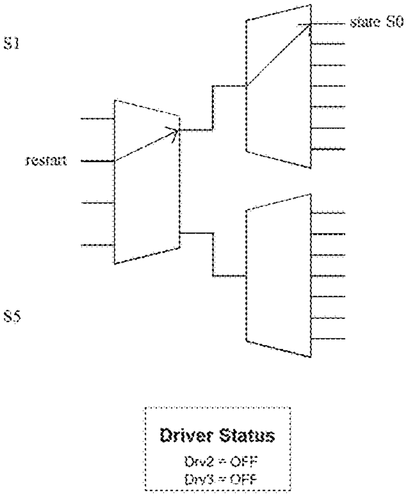
Figure 18:
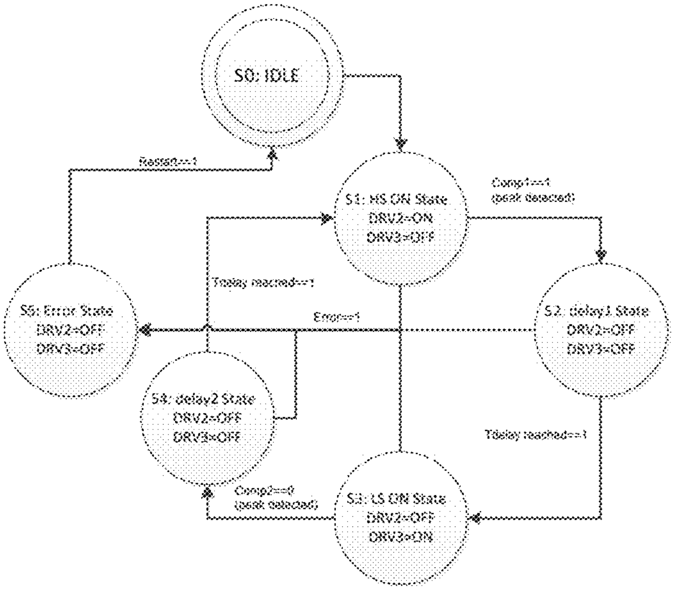

FIG. 1 illustrates a luminaire in accordance with the present disclosure;

FIG. 2 illustrates a switch mode driver in accordance with the present disclosure for the luminaire of FIG. 1;

FIG. 3 illustrates an integrated circuit in accordance with the present disclosure for switching regulation of the switch mode driver of FIG. 2;

FIG. 4 illustrates a first example of a designated driver topology for the switch mode driver of FIG. 2;

FIG. 5 illustrates a number of peripheral mappings adapted to the designated driver topology of FIG. 4;

FIGS. 6-9 illustrate per-state settings of the state machine of FIG. 10;

FIG. 10 illustrates the resulting state machine adapted to the designated driver topology of FIG. 4;

FIG. 11 illustrates a second example of a designated driver topology for the switch mode driver of FIG. 2;

FIG. 12 illustrates a number of peripheral mappings adapted to the designated driver topology of FIG. 11;

FIGS. 13-17 illustrate per-state settings of the state machine of FIG. 18; and FIG. 18 illustrates the resulting state machine 11 adapted to the designated driver topology of FIG. 11.

DETAILED DESCRIPTION OF EXAMPLARY EMBODIMENTS

FIG. 1 illustrates a luminaire 3 in accordance with the present disclosure.

The luminaire 3 comprises a switch mode driver 2 of the second aspect (see FIG. 2 below) and at least one light-emitting diode, LED 31, which can be operated/supplied by the switch mode driver 2.

As used herein, a switch mode driver may refer to a switch mode power supply, i.e., an electronic power supply which incorporates a switching regulator to convert electrical power efficiently.

As used herein, a switching regulator may refer to an electronic circuit which uses a switching element, such as a power switch/FET, to transform applied electric power into pulsed electric power, which may subsequently be smoothed using passive and/or reactive elements.

FIG. 2 illustrates a switch mode driver 2 in accordance with the present disclosure for the luminaire of FIG. 1.

The switch mode driver 2 comprises a designated driver topology 21 and an IC 1 of the first aspect (see FIG. 3 below) for switching regulation of the switch mode driver 2 according to the designated driver topology 21.

In particular, the driver topology 21 may comprise one of: a buck converter, a boost converter, a buck-boost converter, a flyback converter, a resonant converter, and a self-oscillating resonant converter.

As used herein, a driver topology may refer to a particular type of driver/converter.

In accordance with the lighting application described herein, the switch mode driver 2 may comprise an LED driver.

Additionally, the switch mode driver 2 may further comprise a microcontroller 22. Its role will be described in more detail below.

FIG. 3 illustrates an integrated circuit 1 in accordance with the present disclosure for switching regulation of the switch mode driver 2 of FIG. 2.

For descriptive reasons, the driver topology 21 of the switch mode driver 2 is shown on the left (i.e., providing sense signals) as well as on the right (i.e., receiving drive signals) of the IC 1.

In particular, the IC 1 may comprise an application-specific integrated circuit, ASIC.

The IC 1 is designed for switching regulation of switch mode drivers 2 of various driver topologies.

As indicated by a balloon at the top of FIG. 3, the IC 1 comprises a state machine 11 including a finite plurality of states Sx to this end.

A quantity of the plurality of states Sx is adaptable to a designated driver topology 21 of the various driver topologies. As such, an arbitrary (sub) set of the hardware-wise provided finite plurality of states Sx may be used. In particular, the microcontroller 22 mentioned in connection with FIG. 2 may be arranged to adapt the quantity of the plurality of states Sx of the state machine 11 to the designated driver topology 21.

As indicated by a balloon at the bottom right of FIG. 3, a behavior of the plurality of states Sx is adaptable to the designated driver topology 21 via respective state registers 111 in terms of: at least one action 1111 being executed in the respective state, and at least one transition from the respective state to a subsequent state of the plurality of states Sx according to an associated stimulus. In particular, the microcontroller 22 mentioned in connection with FIG. 2 may be arranged adapt the behavior of the plurality of states Sx of the state machine 11 to the driver topology 21, partly by using the adapted number of peripheral mappings.

As used herein, a register may refer to on-chip electronic memory for immediate access by a chip logic.

The at least one action 1111 may comprise one or more of: a setting of a switch driver status DRVx, a starting of a timer, and a stopping of the timer. In particular, the at least one action 1111 may be executable responsive to an entry into the respective state Sx, or an exit from the respective state Sx.

A timer as used herein may refer to a counter configured to be set to an initial value, to be decremented in accordance with a given frequency, and to issue a stimulus such as a level change of a digital signal when being counted down to zero (i.e., timed out, lapsing).

According to the balloon at the bottom right of FIG. 3, the at least one transition according to the associated stimulus may be determined by appropriate configuration of an exit condition multiplexer 1112, which identifies the associated stimulus, in combination with one or more target state demultiplexers 1113, which identify the subsequent state as will be exemplified in connection with FIGS. 6-9 and 13-17 below, via the corresponding state register 111.

The associated stimulus may comprise one or more of: a timeout of a timer, such as tdcm_reached==1, tdelay_reached==1, a level change of a comparator, such as comp_x==1, comp_zx==1, a level change of an error signal, such as error==1, restart==1, a level change of a state/synchronization signal, such as ctrl_update==1, sweep_update==1, and a level change of a signal of a digital input.

As indicated by a balloon at the bottom left of FIG. 3, the IC 1 may further comprise a number of peripheral mappings, being adaptable to the designated driver topology 21. In particular, the microcontroller 22 mentioned in connection with FIG. 2 may be arranged to adapt the number of peripheral mappings to the driver topology 21 via respective peripheral registers 121, in terms of: a mapping of at least one sense pin SENSE x of the designated driver topology 21 and at least one analog resource of the IC 1. In other words, the analog resources behind the sense pins can be defined.

The at least one analog resource may comprise one or more of: a comparator (i.e., an electronic device that compares two voltages or currents and outputs a digital signal indicating a result of the comparison) such as comp_x, comp_zx, a clamper (i.e., an electronic circuit such as a Z-diode that limits either the positive or the negative peak excursions of a signal to a defined value), such as neg_clamp, pos_clamp, an analog-to-digital converter ADC (i.e., a device that converts an analog signal into a digital signal), and the digital input.

The respective peripheral mapping may be achieved by appropriate configuration of a sense pin peripheral selector 1211 via the corresponding peripheral register 121, as will be exemplified in connection with FIGS. 5 and 12 below.

FIG. 4 illustrates a first example of a designated driver topology 21 for the switch mode driver 2 of FIG. 2.

The designated driver topology 21 corresponds to a flyback converter.

The topology provides two sense pins: The sense pin SENSE 1 allows for sensing a primary current, from which an average LED current may be calculated based on the timings ($t_{ON}$, $t_{OFF}$, $t_{DCM}$). The sense pin SENSE 2 allows for detecting a zero crossing of the primary current.

The topology further provides a driver signal DRV2 for a power transistor/switch.

FIG. 5 illustrates a number of peripheral mappings adapted to the designated driver topology 21 of FIG. 4.

In accordance with the two sense pins of the exemplary flyback topology, two corresponding peripheral mappings may be provided.

The sense pin SENSE 1 maps to the comparator comp_1 for threshold comparison of the sensed primary current vs. peak level.

The sense pin SENSE 2 maps to the comparator comp_zx for threshold comparison of the sensed primary current vs. zero level (i.e., zero crossing detection), and to negative clamping neg_clamp and positive clamping pos_clamp.

FIGS. 6-9 illustrate per-state settings of the state machine 11 of FIG. 10.

FIG. 10 illustrates the resulting state machine 11 adapted to the designated driver topology 21 of FIG. 4.

The ON state S (see FIG. 6) involves an action 1111 of setting the switch driver status DRV2=ON. In addition, a stimulus by comparator comp_1 (i.e., comp_1==1⇒peak detected) triggers a transition to OFF state S2, and a stimulus by signal error (i.e., error==1) triggers a transition to an Error state S4.

The OFF state S2 (see FIG. 7) involves an action 1111 of setting the switch driver status DRV2=OFF. In addition, a stimulus by comparator comp_zx (i.e., comp_zx==1⇒zero crossing detected) triggers a transition to DCM state S3, and a stimulus by signal error (i.e., error==1) triggers a transition to the Error state S4.

The DCM state S3 (see FIG. 8) involves an action 1111 of setting the switch driver status DRV2=OFF. In addition, a stimulus by timer tdcm_reached (i.e., tdcm_reached==1⇒lapse of non-conduction period) triggers a transition to the ON state S1, and a stimulus by signal error (i.e., error==1) triggers a transition to the Error state S4.

The Error state S4 (see FIG. 9) involves an action 1111 of setting the switch driver status DRV2=OFF. In addition, a stimulus by signal restart (i.e., restart==1) triggers a transition to an IDLE state S0, whereafter an (unconditional) transition to the ON state S1 may follow.

FIG. 11 illustrates a second example of a designated driver topology 21 for the switch mode driver 2 of FIG. 2.

The designated driver topology 21 corresponds to a buck converter.

The topology provides three sense pins: The sense pin SENSE 1 allows for sensing a buck choke current. If a defined maximum peak is reached a high-side (HS) switch will be turned off, and if a defined minimum peak is reached a low-side (LS) switch will be turned off. The sense pin SENSE 2 allows for sensing an LED voltage. The sense pin SENSE 3 allows for sensing an average buck current.

The topology further provides driver signals DRV2 for the HS power transistor/switch and DRV3 for the LS power transistor/switch.

FIG. 12 illustrates a number of peripheral mappings adapted to the designated driver topology 21 of FIG. 11.

In accordance with the three sense pins of the exemplary buck topology, three corresponding peripheral mappings may be provided.

The sense pin SENSE 1 maps to the comparator comp_1 for threshold comparison (vs. the defined maximum peak) of the sensed buck choke current, and to the comparator comp_2 for threshold comparison (vs. the defined minimum peak) of the sensed buck choke current.

The sense pin SENSE 2 maps to the analog/digital converter ADC for sensing of the LED voltage, and to positive clamping pos_clamp.

The sense pin SENSE 3 maps to the analog/digital converter ADC for sensing of the average buck current.

FIGS. 13-17 illustrate per-state settings of the state machine 11 of FIG. 18.

FIG. 18 illustrates the resulting state machine 11 adapted to the designated driver topology 21 of FIG. 11.

The HS ON state S1 (see FIG. 13) involves an action 1111 of setting the switch driver status DRV2=ON and DRV3=OFF. In addition, a stimulus by comparator comp_1 (i.e., comp_1==1⇒maximum peak detected) triggers a transition to Delay1 state S2, and a stimulus by signal error (i.e., error==1) triggers a transition to an Error state S5.

The Delay1 state S2 (see FIG. 14) involves an action 1111 of setting the switch driver status DRV2=OFF and DRV3=OFF. In addition, a stimulus by timer tdelay_reached (i.e., tdelay_reached==1⇒lapse of delay period) triggers a transition to LS ON state S3, and a stimulus by signal error (i.e., error==1) triggers a transition to the Error state S5.

The LS ON state S3 (see FIG. 15) involves an action 1111 of setting the switch driver status DRV2=OFF and DRV3=ON.

In addition, a stimulus by comparator comp_2 (i.e., comp_2==0⇒minimum peak detected) triggers a transition to the Delay 2 state S4, and a stimulus by signal error (i.e., error==1) triggers a transition to the Error state S5.

The Delay2 state S4 (see FIG. 16) involves an action 1111 of setting the switch driver status DRV2=OFF and DRV3=OFF. In addition, a stimulus by timer tdelay_reached (i.e., tdelay_reached==1⇒lapse of delay period) triggers a transition to the ON state S1, and a stimulus by signal error (i.e., error==1) triggers a transition to the Error state S5.

The Error state S5 (see FIG. 17) involves an action 1111 of setting the switch driver status DRV2=OFF and DRV3=OFF. In addition, a stimulus by signal restart (i.e., restart==1) triggers a transition to an IDLE state S0, whereafter an (unconditional) transition to the ON state S1 may follow.

The invention claimed is:

1. An integrated circuit, IC (1), for switching regulation of switch mode drivers (2) of various driver topologies, the IC (1) comprising:

a state machine (11) including a finite plurality of states (Sx);

a quantity of the plurality of states (Sx) being adaptable to a designated driver topology (21) of the various driver topologies;

a behavior of the plurality of states (Sx) being adaptable to the designated driver topology (21) via respective state registers (111) in terms of at least one action (1111) being executed in the respective state, and at least one transition from the respective state to a subsequent state of the plurality of states (Sx) according to an associated stimulus; and a number of peripheral mappings, being adaptable to the designated driver topology (21) via respective peripheral registers (121) in terms of a mapping of at least one sense pin (SENSE x) of the designated driver topology (21) and at least one analog resource of the IC (1), wherein the at least one analog resource comprises one or more of a comparator (comp_x, comp_zx), a clamper (neg_clamp, pos_clamp), an analog-to-digital converter (ADC), and a digital input.

2. The IC (1) of claim 1, the at least one action (1111) comprising one or more of:

a setting of a switch driver status (DRVx), a starting of a timer, and a stopping of the timer.

3. The IC (1) of claim 2, the at least one action (1111) being executable responsive to an entry into the respective state (Sx), or an exit from the respective state (Sx).

4. The IC (1) of claim 1, the associated stimulus comprising one or more of:

a timeout of the timer (tdcm_reached==1, tdelay_reached==1), a level change of the comparator (comp_x==1, comp_zx==1), a level change of an error signal (error==1, restart==1), a level change of a state or synchronization signal (ctrl_update==1, sweep_update==1), and a level change of a signal of the digital input.

5. The IC (1) of claim 1, the IC (1) comprising an application-specific integrated circuit, ASIC.

6. The IC (1) of claim 1, the switch mode driver (2) comprising an LED driver.

7. A switch mode driver (2), comprising a designated driver topology (21); and an IC (1) of claim 1 for switching regulation of the switch mode driver (2) according to the designated driver topology (21).

8. The switch mode driver (2) of claim 7, the driver topology (21) comprising one of:

a buck converter, a boost converter, a buck-boost converter, a flyback converter, a resonant converter, and a self-oscillating resonant converter.

9. The switch mode driver (2) of claim 7, further comprising a microcontroller (22), being arranged to adapt the number of peripheral mappings to the driver topology (21).

10. The switch mode driver (2) of claim 9, further comprising the microcontroller (22) further being arranged to adapt the quantity of the plurality of states (Sx) of the state machine (11) to the designated driver topology (21); and to adapt the behavior of the plurality of states (Sx) of the state machine (11) to the driver topology (21) using the adapted number of peripheral mappings.

11. The switch mode driver (2) of claim 7, the switch mode driver (2) comprising an LED driver.

12. A luminaire (3), comprising a switch mode driver (2) of claim 11; and at least one light-emitting diode, LED (31), being operable by the switch mode driver (2).

* * * * *